United States Patent [19]
Katoh et al.

[11] Patent Number: 5,912,023
[45] Date of Patent: *Jun. 15, 1999

[54] METHOD OF MANUFACTURING AND A MANUFACTURING DEVICE OF REINFORCED HOSE

[75] Inventors: Yuji Katoh; Hiroshi Shimizu; Shogo Ozawa, all of Saitama, Japan

[73] Assignee: Yamashita Rubber Kabushiki Kaisha, Saitama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/733,168

[22] Filed: Oct. 17, 1996

[30] Foreign Application Priority Data

Oct. 17, 1995 [JP] Japan ................................. 7-268900

[51] Int. Cl.⁶ ............................. B29C 47/20; B29C 47/06
[52] U.S. Cl. ..................... 425/113; 264/102; 264/171.27; 264/174.11; 264/DIG. 78; 425/131.1; 425/462; 425/DIG. 60
[58] Field of Search ................... 264/171.24, 171.12, 264/171.26, 171.27, 174.11; 425/112, 113, 388, 114, 131.1, 462, 467, DIG. 60

[56] References Cited

U.S. PATENT DOCUMENTS

| | | | |
|---|---|---|---|
| 3,697,209 | 10/1972 | Schiesser | 264/171.29 |
| 3,790,651 | 2/1974 | Meitinger | 264/171.12 |
| 3,905,853 | 9/1975 | Stent | 264/171.12 |
| 4,161,379 | 7/1979 | Sudyk | 425/112 |
| 4,671,761 | 6/1987 | Adrian et al. | 264/171.29 |
| 4,734,305 | 3/1988 | Sugimoto et al. | 428/36 |
| 4,859,380 | 8/1989 | Ogata | 264/474 |

FOREIGN PATENT DOCUMENTS

| | | | |
|---|---|---|---|
| 52-17855 | 5/1977 | Japan . | |
| 62-184851 | 8/1987 | Japan | 264/103 |
| 1015954 | 1/1966 | United Kingdom | 264/171.12 |

*Primary Examiner*—Jan H. Silbaugh
*Assistant Examiner*—Mark Eashoo
*Attorney, Agent, or Firm*—Birch, Stewart, Kolash & Birch, LLP

[57] ABSTRACT

A single head forms an outside layer material supply passage connected through to an annular slit at joined portion, a reinforcing material supply passage and an inside layer material supply passage. An outside rubber layer is supplied to the outside material supply passage. A reinforcing cloth is supplied to the reinforcing material supply passage, and an inside rubber is supplied to the inside layer material supply passage respectively. A vacuum is formed up to the pressure of the joined portion by reducing under a vacuum the inside of the reinforcing cloth supply passage, thereby removing water or gas such as air attaching to both surfaces of the reinforcing cloth and increasing the adhesion of the outside rubber layer and the inside rubber layer with the reinforcing cloth being half there between.

8 Claims, 8 Drawing Sheets

METHOD OF MANUFACTURING AND A MANUFACTURING DEVICE OF REINFORCED HOSE

BACKGROUND OF THE INVENTION

1. Field of the Invention

The invention relates to a method and a device adapted for manufacturing a reinforced hose such as a rubber hose with a reinforcing fiber material being caused to be interposed between the inside and outside layers.

2. Prior Art

In patent publication Sho 52-17855 a device is disclosed for manufacturing a reinforced hose wherein a supply passage is provided within the same head for providing a plastic material for an inside layer and a plastic material for an outside layer and a reinforcing cloth (reinforcing fiber material) between both layers, to thereby manufacture a reinforcing hose by one extrusion process (hereinafter called as a single stage process method).

Further, it has been practiced in the past to form these three layers in turn by a continuous process, and in the case, the process comprises a second process wherein a reinforcing yarn is spirally wound on the surface of an inside layer tube extruded in a first process and a third process for forming further an outside layer thereon, and a third process, where adhesion of the outside layer, reinforcing yarn and inside layer tube is increased by suction under a reduced pressure (hereinafter called as a multiple stage process method).

PROBLEMS IN THE PRIOR ART

Incidentally, when the circumference of the reinforcing fiber material such as reinforcing cloth or yarn with water or air being attached thereto is joined with the inside and outside layers, the inside layer and the outside layer are easily made to peel off from the reinforcing fiber material thereby reducing the reinforcing effect of the reinforcing fiber material. In order to improve the strength of the reinforced hose, it is necessary to increase the adhesion of the reinforcing fiber material and the inside and outside layers, so that the improvement of the adhesion is especially important when aiming at manufacturing of produces of high performance.

On the other hand, in order to improve the adhesion with the reinforcing fiber material, when the plastic material of the inside and outside layers is caused to be firmly compressed against the reinforcing fiber material for joining, the reinforcing fiber material must be pulled out from the head with a greater force. For this reason, since the dimensions of the reinforcing fiber material do not stabilize if such reinforcing fiber material is of a knit or resin film which is easily stretched, such stretchy reinforcing fiber material cannot be used and the use thereof is limited to a material having high dimensional stability and rigidity such as leno cloth. However, in the case where a product is used for an application wherein the product is subjected to repeated bending, the use of a flexible reinforcing fiber material such as a knit was eagerly desired.

Moreover, when the reinforcing cloth made of woven cloth such as the knit is used, since the single fiber of the reinforcing cloth remains in direct contact in the entangled portion even after it is joined with the inside and outside layers, when it is used for a long time in a condition where a repeating force is applied, there is the possibility that the reinforcing cloth itself is broken, so that this is also desired that the mutually direct contact of the single fibers can be prevented.

In addition to that, since a relatively large amount of gas such as steam or air is caught and stays in the joined portion even after the compression provided in such a manner as above, pressure must be applied during vulcanization to an extruded but not yet vulcanized hose in an application where high strength is required of a product such as a rubber hose for pressurized fluid for automobiles. However, since this pressurized vulcanizing is a batch process, continuous forming such as vulcanizing under normal pressure became impossible, posing a problem in improving the forming efficiency.

What is more, according to the foregoing multiple step process method, it is not possible to reduce the pressure of the joint portion with the inside and outside layers while winding the reinforcing yarn, there is the possibility of the attachment of water or air through the gap between the inside layer tube and the reinforcing yarn.

Since pressure reduction in the third process is carried out by the suction of the inside layer circumference with a vacuum pump while feeding the inside layer wound with the reinforcing yarn tube into the head, the passage in the head for feeding the inside layer tube requires a clearance to some extent and the passage must be relatively short in order to prevent the physical change of the inside layer tube.

As a result, the pressure of the joined portion of the outside layer within the head is not reduced so much, so that even if it is possible to increase to an extent the adhesion between the outside layer, reinforcing yarn and inside layer tube by means of suction under a pressure reduction, it will not be possible to obtain the adhesion which meets the case where higher performance is required.

SUMMARY OF THE INVENTION

In a method for manufacturing a reinforced hose according to the present invention, wherein a reinforced hose is formed by simultaneously supplying within the same head a reinforcing fiber material between a plastic material for an inside layer and a plastic material for an outside layer, the portion where the plastic material for an inside layer and the reinforcing fiber material are jointed and integrated and the pressure of the portion where the plastic material for an outside layer and each layer of the reinforcing fiber material are joined and integrated are reduced.

Further, a degree of pressure reduction in the present invention which is applied to the joined portion means a pressure reduction state lower than the atmosphere, for instance a pressure reduction extending below about 600 mmHg is included. Also, the woven cloth and nonwoven cloth is included in the reinforcing fiber material.

The device for manufacturing a reinforcing hose used for the method of above, a supply passage of the plastic material for an inside layer, that of the plastic material for an outside layer and that of the reinforcing fiber material are provided within the same head so as to join at the tip of the supply passage, the material supply passage for the reinforcing fiber material is caused to be joined between the supply passage of the plastic material for an inside layer and that of the plastic material for an outside layer, the reinforcing material supply passage is connected to a vacuum pump to reduce the pressure of the aforementioned joined portion, the reinforcing material supply passage is connected to a pressure reducing passage of the exterior of the head, to thereby supply the reinforcing fiber material to the reinforcing material supply passage through the pressure reducing passage.

In this case, the vacuum pump is connected between the reinforcing material supply passage and the vacuum pump as the pressure reducing passage, so that it is possible to contain the roll of reinforcing fiber material in this vacuum tank.

Instead of the vacuum tank, it is also possible to make the pressure reducing passage of an open type with one end of the pressure reducing passage connected to the reinforcing material supply passage, the other end thereof is opened to the atmosphere and the atmosphere opening portion is an inlet of the reinforcing fiber material to the pressure reducing passage. In this case, the vacuum pump is connected from the outlet of the pressure reducing passage to the head side.

This pressure reducing passage can be formed by folding it in a plurality of stages, in which case, it is also possible to form the pressure reducing passage in the joined portion of a block which overlaps in a plurality of stages.

Moreover, a roller with a part thereof fronting into the pressure reducing passage is provided, so that it is possible to feed the reinforcing fiber material pressurized by means of this roller.

Furthermore, it is also possible to use a knit as the reinforcing cloth composing the reinforcing fiber material in the aforementioned manufacturing method or the manufacturing device.

Furthermore, it is also possible that the reinforcing fiber member is sent by a sending belt which is wound and hung between a pair of rollers provided inside and outside of the pressure reducing passage, and a seal member is provided in an inlet of the sending belt and the reinforcing fiber member to the pressure reducing passage.

The sending belt and the seal member may be composed of self-lubricating material respectively.

EFFECTS OF THE INVENTION

In the method of manufacturing a reinforcing hose according to the present invention, the pressure of the portion where the respective layer of a plastic material for an inside layer and a reinforcing fiber material and a plastic material for an outside layer and a reinforcing fiber material are joined and integrated, is reduced in the aforementioned single stage process.

According to a method of manufacturing such as this, since it is possible to form a high vacuum respectively in the jointed portion of the plastic material for an inside layer and the reinforcing fiber material and the jointed portion of the plastic material for an outside layer and the reinforcing fiber material, it is possible to remove water and gas such as air mixing into these joined portions almost completely.

Therefore, it is possible to integrate the plastic material for an inside layer, plastic material for an outside layer, and reinforcing fiber material with high adhesion.

Since it becomes difficult for the inside and outside layers to be peeled from the reinforcing fiber material and the reinforcing effect when the reinforcing fiber material becomes noticeable, it is possible to improve the strength of the reinforced hose to thereby remarkably improve the durability.

As a result, in the case of a fluid pressurizing hose for a certain type of automobile, it is possible to obtain a high performance product which can be used satisfactorily for an application where high pressure is applied repeatedly.

Moreover, when vulcanizing a unvulcanized hose extruded from the head, since it is possible to adopt vulcanization under normal pressure, the vulcanizing process can be made continuously unlike the conventional batch process, to thereby considerably improve the forming efficiency.

Furthermore, since the adhesion of the plastic material for inside and outside layers with respect to the reinforcing fiber material is accomplished by suction under a vacuum from the side of the reinforcing fiber material, that is, from the inside it is not necessary to compress the plastic material for an outside layer form the side of the bed in order to increase the adhesion as in the case of a conventional method.

Therefore, the pressure for extruding a vulcanized hose form the head is reduced, so that the force for pulling out the reinforcing fiber material can also be small.

As a result, since unnecessary stretching caused for pulling out the reinforcing fiber material from the bed with a large force is restrained, it is possible to obtain a product of high dimensional stability and use the reinforcing fiber material as the reinforcing material.

In addition, in the manufacturing device intended for the method of manufacturing, the reinforcing material supply passage is connected to the vacuum pump, the joined portion of the plastic material for an inside layer and the reinforcing material supply passage and the joined portion of the plastic material for an outside layer and the reinforcing material supply passage are sucked under a vacuum, the reinforcing material supply passage is connected to the pressure reducing passage of the exterior of the head, and the reinforcing fiber material is supplied to the reinforcing material supply passage through the pressure reducing passage.

In this manner, since the reinforcing fiber material is supplied from the pressure reducing passage of the exterior of the head, it is possible to maintain a high vacuum in each of the aforementioned joined portions, to thereby obtain various effects such as an improvement in adhesion.

If the vacuum tank is made of a pressure reducing passage and the roll of the reinforcing fiber material is contained therein, the pressure reducing passage becomes a closed type passage, so that it is possible to maximize the vacuum of the joined portion.

Still more, instead of the vacuum tank, it is also possible to provide a passage cross section which is almost the same size as the width and thickness of the reinforcing fiber material, connect one end of the pressure reducing passage to the reinforcing material supply passage, and make an open type pressure reducing passage with the other end opened to atmosphere.

In this case, by passing the reinforcing fiber material having a cross section which is almost the same as the cross section of the pressure reducing passage, a high vacuum is maintained in the reinforcing material supply passage, and continuous process is made possible by arranging the roll in the atmosphere.

Further, when the pressure reducing passage is formed by folding it into a plurality of stages, it is possible to make the passage sufficiently long so as to separate the outlet side effectively from the inlet side opened to the atmosphere, restrict the reduction of vacuum on the outlet side to an extent without influence, and miniaturize the entire device at least in the direction of the length by folding back the pressure reducing passage.

By forming at this time the pressure reducing passage in the joined portion of blocks overlaying in a plurality of stage, it is possible to easily form the overlaid pressure reducing passage.

And furthermore, when a roller is provided with a part thereof facing into the pressure reducing passage so that the device is arranged to send the reinforcing fiber material pressurized by the roller, it is possible to increase the adhesion on the outlet side in the pressure reducing passage, it is possible to further reduce the length of the passage so as to miniaturize the entire device even if the pressure reducing passage is of an open type, thereby easily adopting to changes in thickness and width of the reinforcing fiber material.

In addition, it is also possible to use a knit as the reinforcing cloth in the aforementioned manufacturing method or manufacturing device, and in this case, the elasticity and flexibility of the knit itself allow easy following with bending or expansion and contraction of the hose which is the product.

Therefore, dimensional stability is increased although a knit is used as mentioned above, at the same time, even during severe use with no rigidity such as use of the conventional leno cloth and the single fiber composing the reinforcing cloth being bent repeatedly at the portion of mutual entangled, the inner and outer layer material comes into the portion of the single fiber mutually entangled area, and mutual direct contact of the single fiber in the portion of the single fiber entangling mutually can be prevented so that the durability is remarkably increased.

Where the reinforcing fiber member is sent by a sending belt wound and hung between a pair of rollers provided inside and outside of the pressure reducing passage, and the seal member is provided in an inlet of the sending belt and the reinforcing fiber member to the pressure reducing passage, it is possible to reduce the pressure inside of the pressure reducing passage.

When, if the sending belt and the seal member are composed of a self-lubricating material respectively, the resistance on transferring of the reinforcing cloth can be lessen, and since it is not required to make the tension applied to the reinforcing cloth excessively large, cutting on transferring of the reinforcing cloth can be prevented and the transferring devices such as a motor can be made compact.

DETAILED DESCRIPTION OF THE PREFERRED EMBODIMENT

Figure 2:
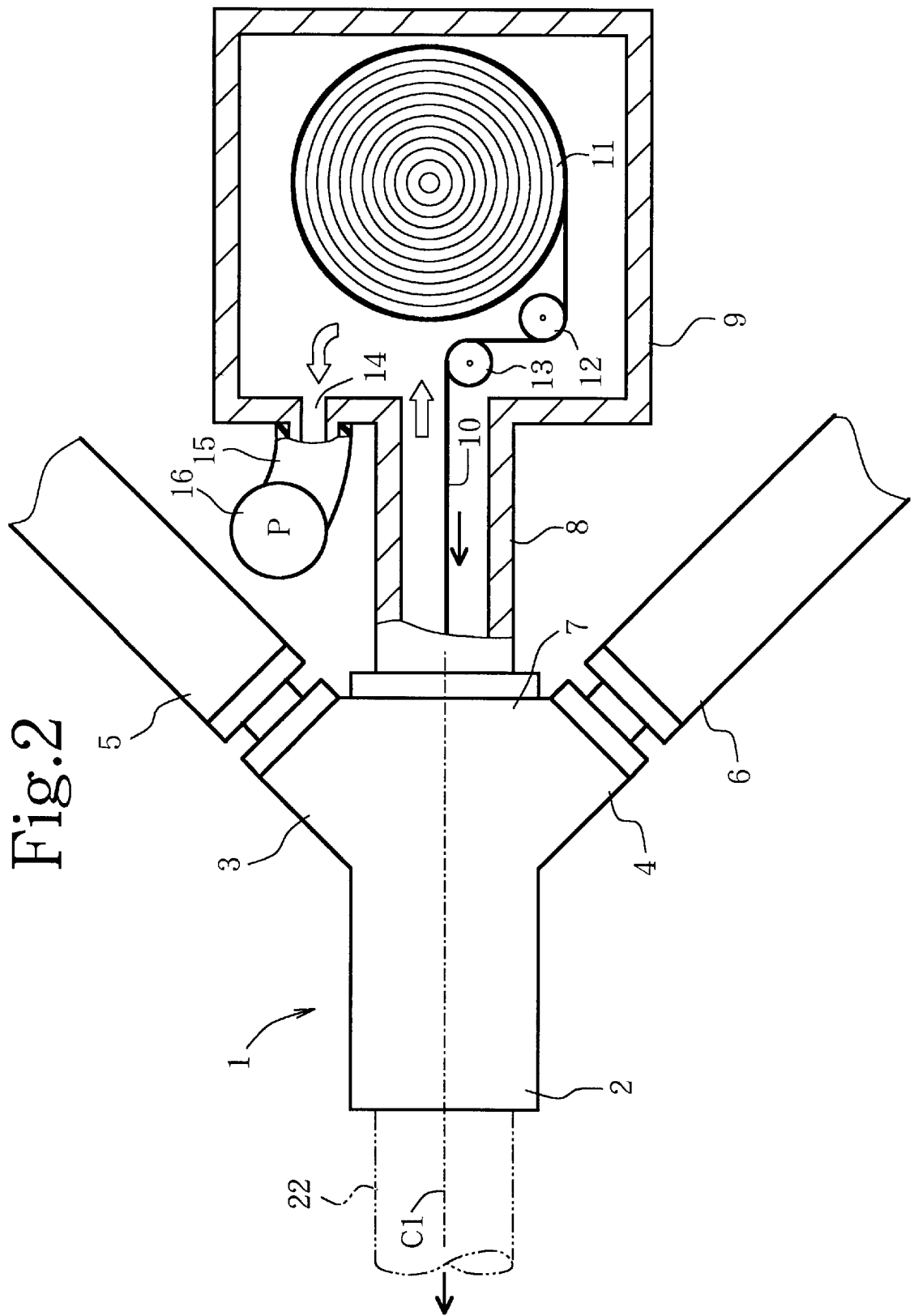
FIG. 2 is a schematic diagram of the overall device.

FIG. 2 shows the overall structure of the device, in which a head 1 is equipped with a product extruding nozzle section 2 which sticks out along the extruding axis C1 of the hose, an outside layer side joint 3 which sticks out to spread backward diagonally form the rear of the extruding nozzle section 2 (the extruding direction is the front) with the axis C1 there between, and an inside layer side joint 4, and an extruding nozzle 5,6 of crude rubber is respectively connected thereto.

At the rear end section of the head 1 is provided a central joint 7 to which an end of a guide tube 8 is connected. The other end of the guide tube 8 is connected to a vacuum tank 9 which forms a closed type pressure reducing passage, and a reinforcing cloth 10 is contained in the inside of the vacuum tank 9.

The reinforcing cloth 10 is a cloth made of a knit, and a roll 11 thereof is entirely contained in the vacuum tank 9. The roll 11 is replaced by a batch process whereby the vacuum tank 9 is opened.

Further, the knit used for the reinforcing cloth 10 is made to easily stretch at least in the vertical direction (the feeding direction in the diagram) so as to bend flexibly with respect to the bending, provided that the knit may stretch in both the vertical and horizontal directions as occasion demands.

The reinforcing cloth 10 enters the guide tube 9 which forms a part of the pressure reducing passage through a roller 12,13 provided inside the vacuum tank 9 and is supplied to the inside of the head 1 from the central joint 7.

On the wall section of the vacuum tank 9 is provided a suction port 13 which is connected therefrom to an outside vacuum pump 16 through a hose 15, to thereby form a vacuum inside of the vacuum tank 9 and the guide tube 9 as well as the inside of the head 1 through the vacuum tank 9 and the guide tube 8 as mentioned later.

Figure 1:
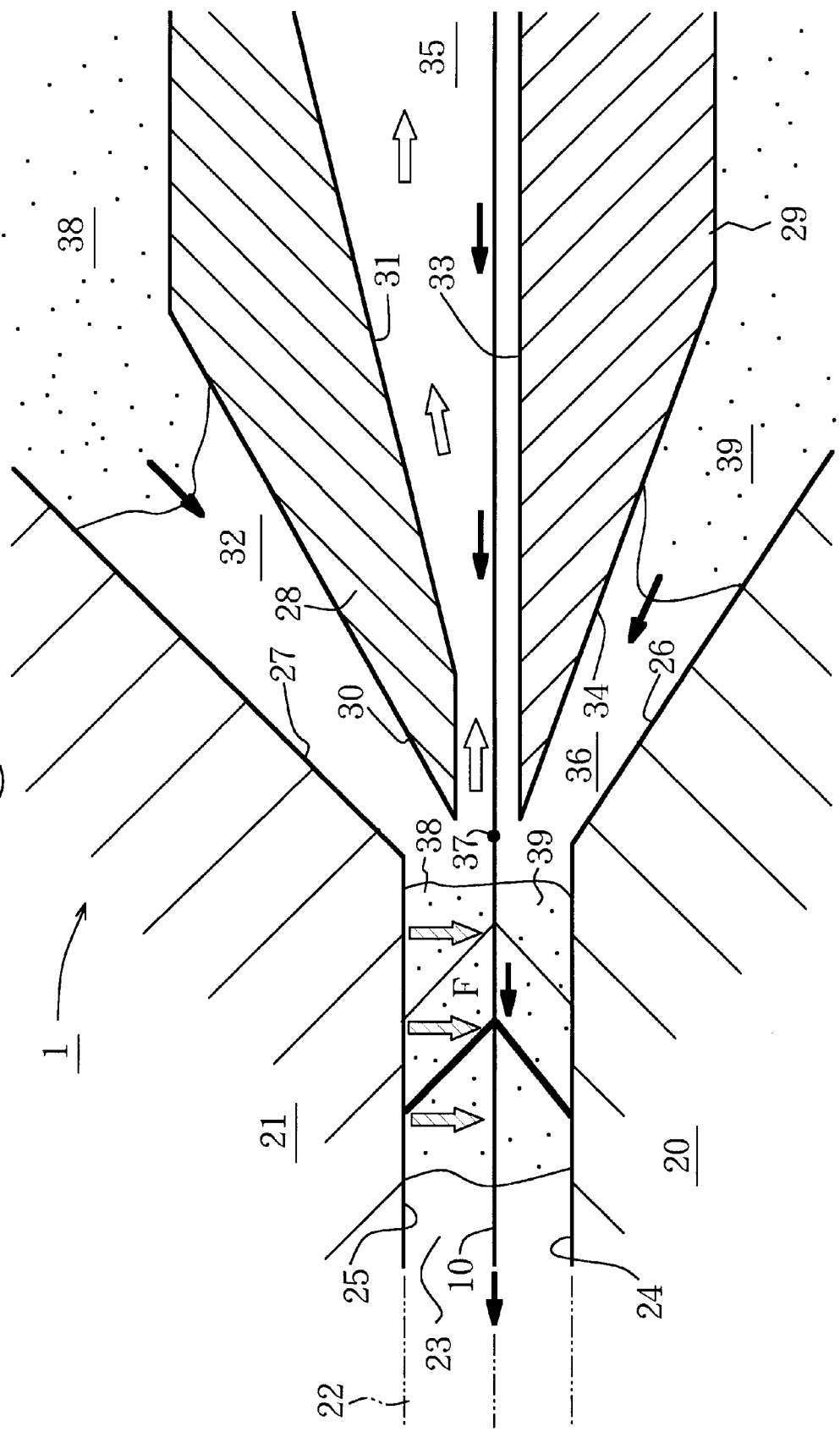
FIG. 1 is a partially enlarged cross-sectional view of main parts.
Figure 3:
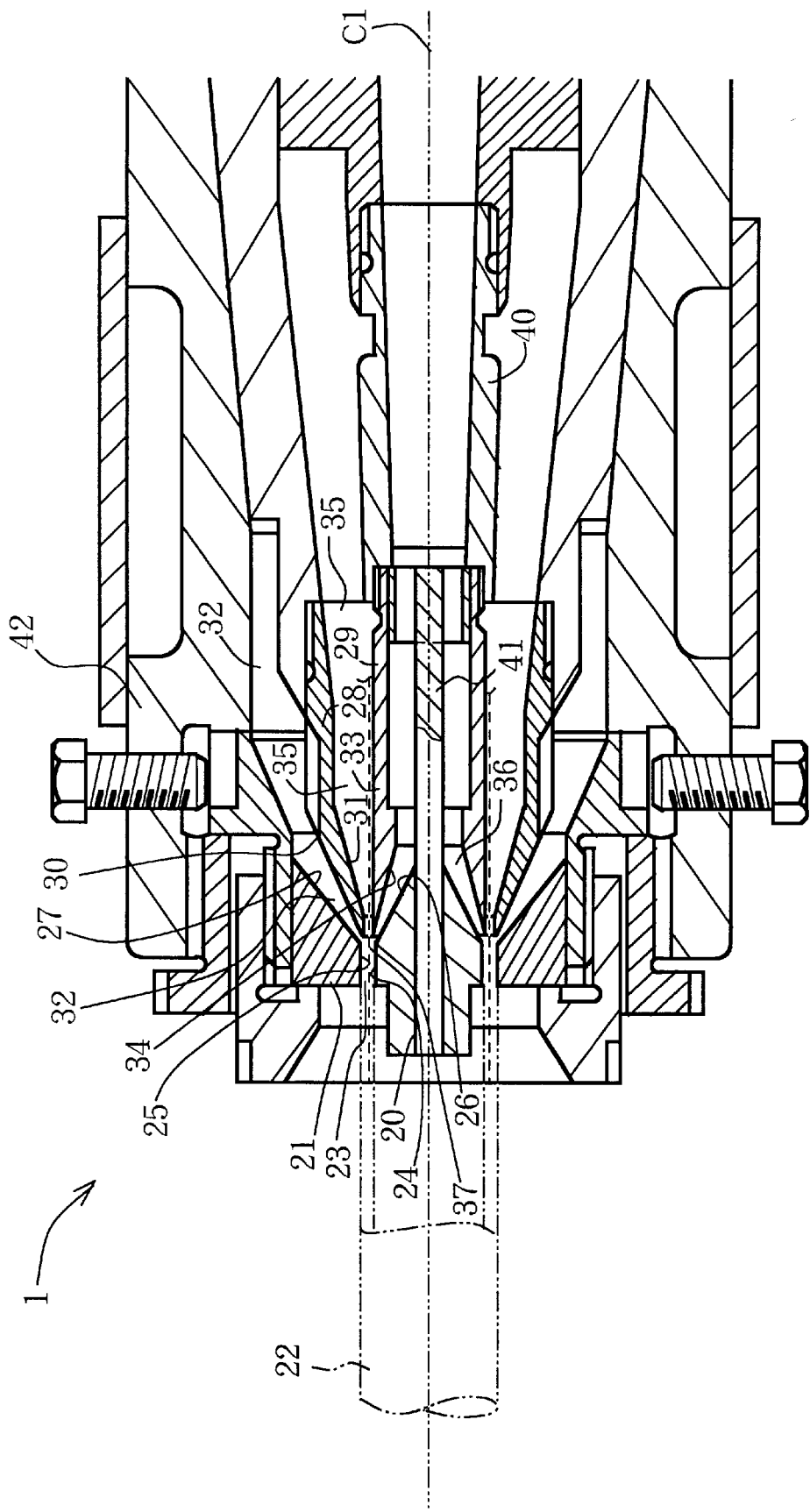
FIG. 3 is a cross-sectional view of the head.

As is apparent from FIG. 3, which is an enlarged cross section of the front portion of the head 1 and FIG. 1 which is a part of FIG. 3 showing a further enlarged joined portion of the reinforcing cloth 10 and the inside and outside rubber layer, the front end portion of the head 1 is provided with a core 20 and a die 21 which surrounds the front portion of the head 1.

Between the outside circumference of the core 20 and the inside circumference of the die 21 is formed an annular slit 23 to send out a semimanufactured hose 22. The semimanufactured hose 22 is a semimanufactured product before vulcanizing which is shaped like a hose adhered closely with the inside and outside rubber layer that hold the reinforcing cloth 10 therebetween. The annular slit 23 is concentric with the outside circumference of the core 20 and the inside circumference of the die 21 and is almost equivalent to the thickness of the semimanufactured hose 22.

On the outside circumference of the core 20 and the inside circumference of the die 21 is formed a linear cross section 24,25 which is respectively parallel tot he extruding axis C1, and the rear section respectively thereof is continued to a slope 26 which is inclined inwardly and a slope 27 which is inclined outwardly.

In the space spreading backward and formed between the slope 26 and the slope 27 are provided a guide ring 28 and a front joint 29 and the front joint 29 is concentrically inserted into the inside of the guide ring 28.

The guide ring 28 is equipped with an outside circumference slope 30 and an inside circumference slope 31, and the outside circumference slope 30 forms an outside layer material supply passage 32 which faces the slope 27 with a space therefrom.

The front joint 29 is equipped with an outside circumference surface 33 and an inside circumference slope 34 of linear cross section, the outside circumference surface 33 forms a reinforcing cloth supply passage 35 between the outside circumference surface 33 and the inside circumference slope 31, and the inside circumference slope 34 faces the slope 26 with a space therefrom so as to form an inside layer material supply passage 36.

At the joined portion 37, the annular slit 23 is made to be communicated to three supply passages consisting of the outside layer material supply passage 32, reinforcing cloth supply passage 35 and inside layer material supply passage 36.

The outside layer material supply passage 32 is communicated to the raw rubber extruding nozzle 5 (FIG. 2) through the outside layer side joint 3, and the inside layer material supply passage 36 is communicated to the raw rubber extruding nozzle 6 through the inside layer side joint 4, and an outside layer rubber 38 and an inside layer rubber 39 which are not vulcanized or half vulcanized are supplied as the plastic material respectively to the extruding nozzle 5 and the extruding nozzle 6.

On the other hand, since the reinforcing cloth supply passage 35 is communicated to the guide tube 8 through the central 7, the reinforcing cloth 10 from the guide tube 8 is supplied to the jointed portion 37. At this time, since the reinforcing cloth supply passage 35 is connected to the vacuum tank 9 through the guide tube 8 and the reinforcing cloth 10 and the roll 11 thereof are entirely contained in the vacuum tank 9, the vacuum tank 9 and the guide tube 8 for sending out the reinforcing cloth 10 to the reinforcing cloth supply passage 35 are of a closed type. Therefore, when a pressure reduction is performed by the vacuum pump connected to the vacuum tank 9, since the passage of the reinforcing cloth 10 is closed entirely through the guide tube 8, vacuum tank 9 and reinforcing cloth supply passage, the specified high vacuum state is maintained up to the joined portion 37 by the vacuum pump 16 for the most part.

In addition, in FIG. 3 a back joint 40 forms a part of the inside layer material supply passage, holds the guide ring 28 and the front joint 29 concentrically, and supports the core 20 through an axis center rod 41. The case 42 supports the die 21.

When a reinforcing hose is manufactured in this device, the outside rubber layer 38 and the inside rubber layer 39 are joined at the joined portion 37, but the reinforcing cloth 10 nearing the joined portion as it is rounded gradually into a cylindrical shape at this time is supplied between the joined portion of the outside layer rubber 38 and the inside layer rubber 39 so that the three layers are integrated.

At this time, as is apparent in FIG. 1, since a high vacuum of the reinforcing cloth supply passage 35 is maintained up to the joined portion 37, water and gas such as air is removed almost completely, so that the outside layer rubber 38 and the inside layer rubber 39 are respectively integrated at high adhesion on both the inside and the outside surfaces thereof.

Moreover, by maintaining a high vacuum up to the joined portion 37, the outside layer rubber 38 and the inside layer rubber 39 are applied with a force in a mutually approaching direction, so that integration with greater strength can be accomplished.

In addition to that, since the linear cross section 25 is formed in the die 21 and the outside layer rubber 38 having entered the inside of the annular slit 23 from the joined portion 37 generates a force F toward the direction of the axis C1 from the linear cross section 25, the outside layer rubber is caused to adhere to the reinforcing cloth 10 and the inside layer rubber 39 with greater strength so as to be joined and integrated. However, the adhesion (secondary adhesion) taking place here is supplementary, and the adhesion (primary adhesion) caused by a high vacuum in the aforementioned joined portion 37 has priority. Therefore, if the adhesion is sufficient, it is so arranged that the aforementioned force F is minimized in the secondary adhesion and that the semimanufactured hose 22 is smoothly sent out from the head 1.

Therefore, it is possible to cause the reinforcing cloth 10 to adhere to the joined surfaces of the outside rubber layer 38 and the inside rubber layer 29, and moreover, since water or gas such as air can be mostly removed from the reinforcing cloth 10, it is possible to remarkably improve the adhesion between these three layers, and by vulcanizing thereafter the semimanufactured hose 22 obtained in this manner, it is possible to form a reinforcing hose of a high strength as a final product.

Furthermore, since the outside rubber layer 38 and the inside rubber layer 39 also enter between single fibers forming the reinforcing cloth which is a knit, it is possible to prevent the direct contact in the portion where single fibers are mutually entangled, thereby increasing the durability as well.

Still more, as the material of the outside rubber layer 38 and the inside rubber layer 39, it is possible to use various plastic rein materials no only limiting to rubber.

Next, a form of a second embodiment will be explained based on FIG. 3 and FIG. 5. The same symbols will be used for the same portion as the form of the aforementioned embodiment (the same applies to the form of other embodiments of the following).

Figure 4:
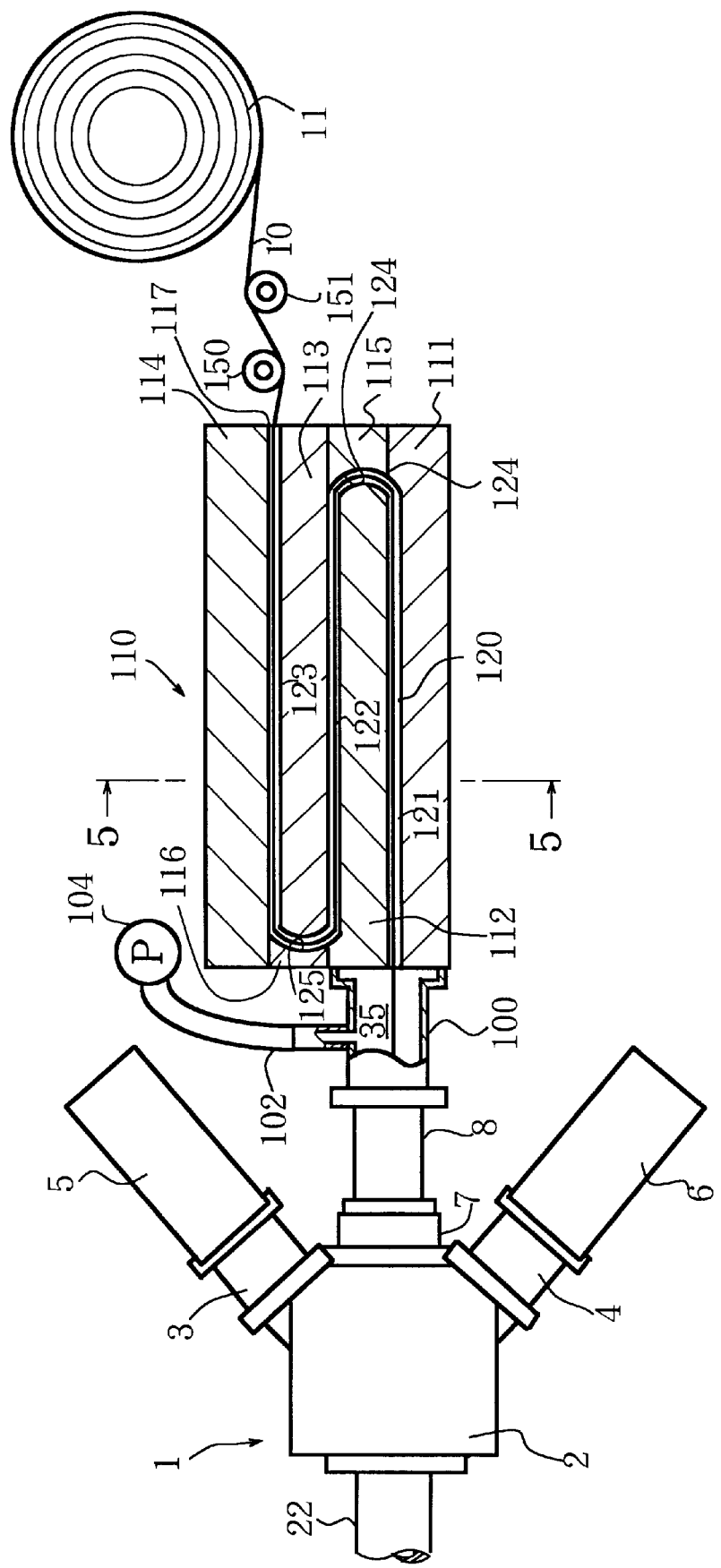
FIG. 4 is a partial cutaway view of the general drawings in the form of the second embodiment.
Figure 5:
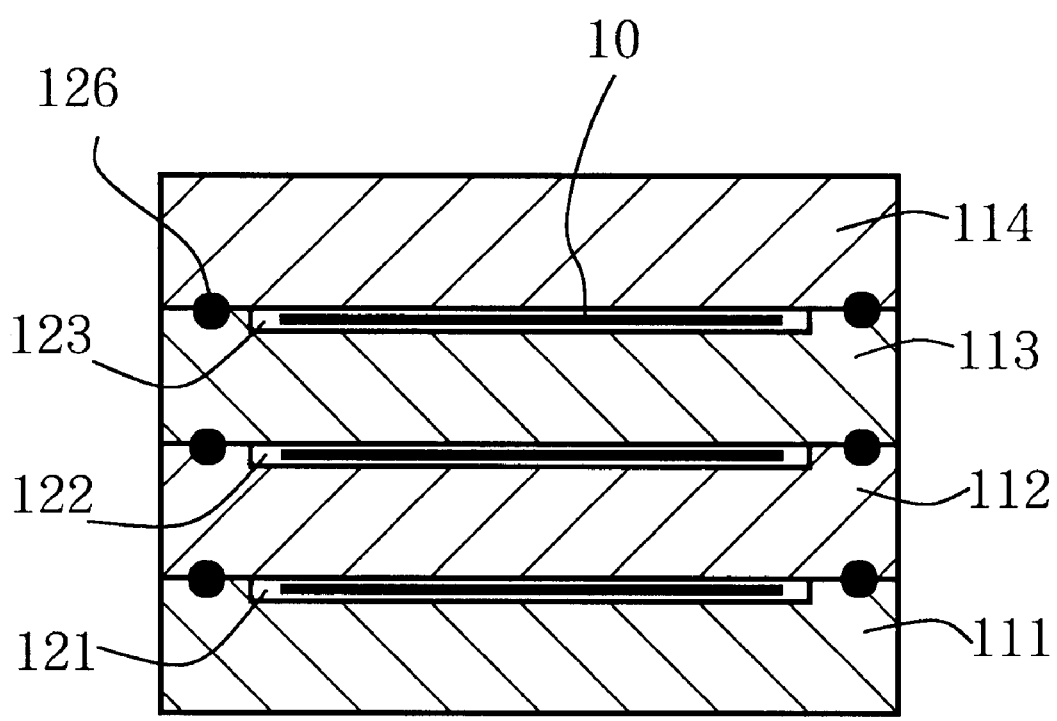
FIG. 5 is a cross-sectional view of the line 5—5 of FIG. 4.

FIG. 4 is a diagram illustrating a partially cutaway view of the entire device in the form of the second embodiment, and FIG. 5 is a cross sectional view of the line 5—5 of FIG. 4. As is apparent in these figures, at the back of the guide tube 8 is connected a pressure reducing member 110 through a connecting pipe 100. To this connecting pipe 100 is connected a vacuum pump 104 through a hole 102.

The pressure reducing member 110 is composed of a plurality of blocks and assembled by overlaying a plate-shaped first stage member 111, a second stage member 112, a third stage member 113 and a fourth stage member 113 as well as a first edge member 115 between the first stage member 111 and the third stage member 113 and a second edge member 116 between the second stage member 112 and the fourth stage member 114, and an open type pressure reducing passage 120 folded in many stages is formed between these blocks.

The pressure reducing passage 120 is formed by a surface groove from 121 to 123 and a guide groove 124, 125 as well as the joining surface of adjacent stage members, and provides a passage cross section almost equivalent to the width and thickness of the reinforcing cloth 10.

Each surface groove from 121 to 123 is formed respectively on each joining surface of the first stage member 11, the second stage member 112 or the third stage member 113 so as to spread into the direction of the plane of each stage member at a depth of almost the same as the thickness of the reinforcing cloth 10, and one side is opened so that the surface groove from 121 to 123 is closed by the joining surface between adjacent stage members.

The surface groove 121 is formed on the upper surface of the first stage member 111 which joins the lower surface of the second stage member 112, the front end (on the head 1 side) is opened so as to be connected to the connecting pipe 100, the rear end (on the roll 11 side) forms a dead end and is connected to the curved guide groove 124 formed on the surface of the vertical direction of the first edge member 115 placed at the rear end portion of the first stage member 111.

The surface groove 122 is formed on the upper surface of the second stage member 112 which joins the lower surface of the third stage member 113, the rear end forms a dead end and is connected to the guide groove 124 of the first edge member 115, and the front end also forms a dead end and is connected to the similar guide groove 125 formed on the second edge member 116 placed on the front end of the second stage member 112.

The surface groove 123 is formed on the upper surface of the third stage member 113 which joins the lower surface of the fourth stage member 114, the front end forms a dead end and is connected to the guide groove 125 of the second edge member 116, and the rear end is opened backward to form an opening 117 at the back of the pressure reducing member 110.

The reinforcing cloth 10 enters the pressure reducing passage 120 from the opening 117 formed on the back of the pressure reducing member 110, enters the connecting pipe 100 from the front end of the surface groove 121 while moving in a zigzag direction through each stage, and is supplied further to the reinforcing cloth supply passage 35 in the head 1.

Between the opening 117 of the pressure reducing member 110 and the roll 11 are provided rollers 150, 151. In such a open type pressure reducing passage, the roll side atmosphere opening is the inlet and the head 1 side joint opening is the outlet.

The symbol 126 shown in FIG. 5 is a sealing member to secure the seal on the joining surface between each stage member.

Further, the pressure reducing passage 1210 is formed into three stages so as to fully secure the passage length, but the number of stages is not limited to such numbers and can be freely decreased or increased.

In a device in the form of the present embodiment, when the pressure reduction is carried out by the vacuum pump 104 in front of the pressure reducing member 110, pressure from the reinforcing cloth supply passage 35 to the pressure reducing passage 120 is reduced and the opening 117 which is opened to atmosphere is remotely separated from the connected portion of the vacuum pump 104 by means of the pressure reducing passage 120 having a sufficiently long passage.

Therefore, it is possible to maintain a high vacuum in the reinforcing cloth supply passage and increase the adhesion between the aforementioned inside and outside layer rubber materials and the reinforcing cloth, and the roll 11 can be installed in the atmosphere, so that it is possible to carry out continuous forming by immediately replacing the roll 11 even when it runs out.

Since the pressure reducing passage 120 is folded to form many stages, it is possible to miniaturize the pressure reducing member 110 at least in the direction of the length. Further, since the pressure reducing passage 120 is formed simply by overlaying from the first stage member 11 to the fourth stage member 113 and the first edge member 115 and 116, assembly of the pressure reducing member 110 is easy, and when the number of stages is increased or decreased as occasion demands, the number of folding stages can be changed freely.

Figure 6:
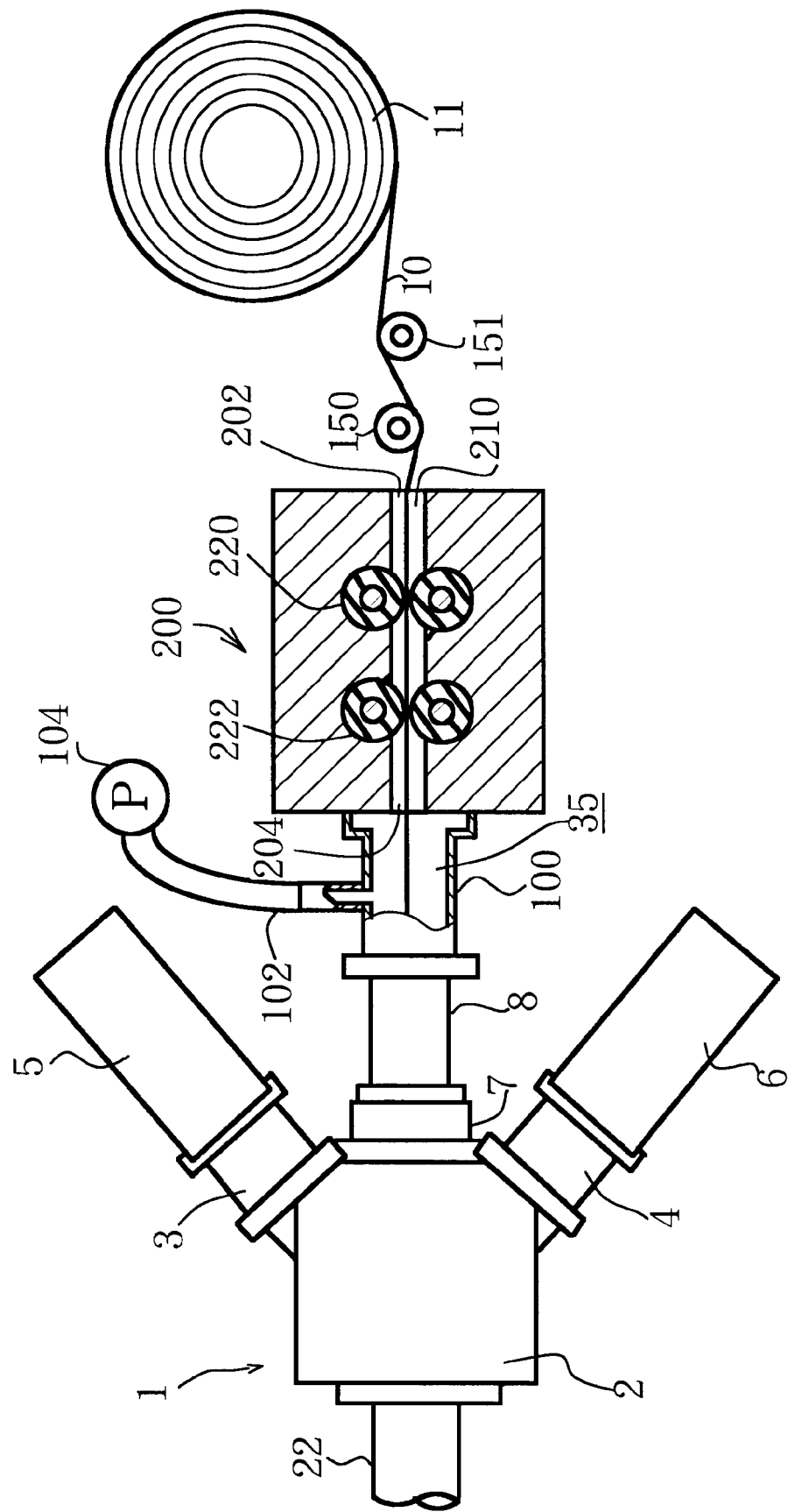
FIG. 6 is a diagram corresponding to FIG. 4 in the form of the third embodiment.

Next, the form of a third embodiment will be explained according to FIG. 6. FIG. 6 is a diagram corresponding to FIG. 4 in the form of the third embodiment. The form of the third embodiment possess an open type pressure reducing passage similarly to the form of the second embodiment, but the pressure reducing member is changed to the pressure reducing member 110 which possess the pressure reducing passage 120 with many folded stages, to thereby provide a roller type pressure reducing member 200.

In the roller type pressure reducing member 200, a linearly short pressure reducing passage 210 is provided from the opening 202 which is an inlet of the reinforcing cloth to the head 1. The pressure reducing passage 120 is formed with a height which has some allowance than the height of the aforementioned pressure reducing passage 100 with respect to the thickness of the reinforcing cloth 10.

In the vicinity of the central portion of the pressure reducing passage 210 are provided rollers 220, 222, and by transferring the reinforcing cloth 10 by compressing each roller from the upper and lower side with these rollers, it is possible to secure the specified reduced pressure level in the reinforcing cloth supply passage 35 so as to easily send out the reinforcing cloth 10 easily. In the form of the present embodiment, rollers are provided in two stages in the front and rear but the roller arrangement is not limited thereto.

In a device according to the form of the present embodiment, since the roller 220, 222 transfer the reinforcing cloth 10 while compressing it from the upper and lower side, it is possible to remove water or gas contained in the reinforcing cloth 10 by extruding it, to eliminate the void around the reinforcing cloth 10, it is possible that the outlet 204 side of pressure reduction passage 210 can reduce the length of the pressure reducing passage while maintaining a specified pressure reduction in the reinforcing cloth supply passage 35.

Therefore, it is possible to miniaturize the entire device. In addition, even when the thickness or width of the reinforcing cloth 10 is changed, the flexibility with respect to design change and the like is increased since the roller type pressure reducing member 200 can be used as it is in many cases without replacing the roller type pressure reducing member 200.

Next, the form of a fourth embodiment will be explained according to FIGS. 7 and 8. The fourth embodiment uses a roller type pressure reducing member 300 which is the same as the third embodiment, but it can reduce the pressure more efficiently.

Figure 7:
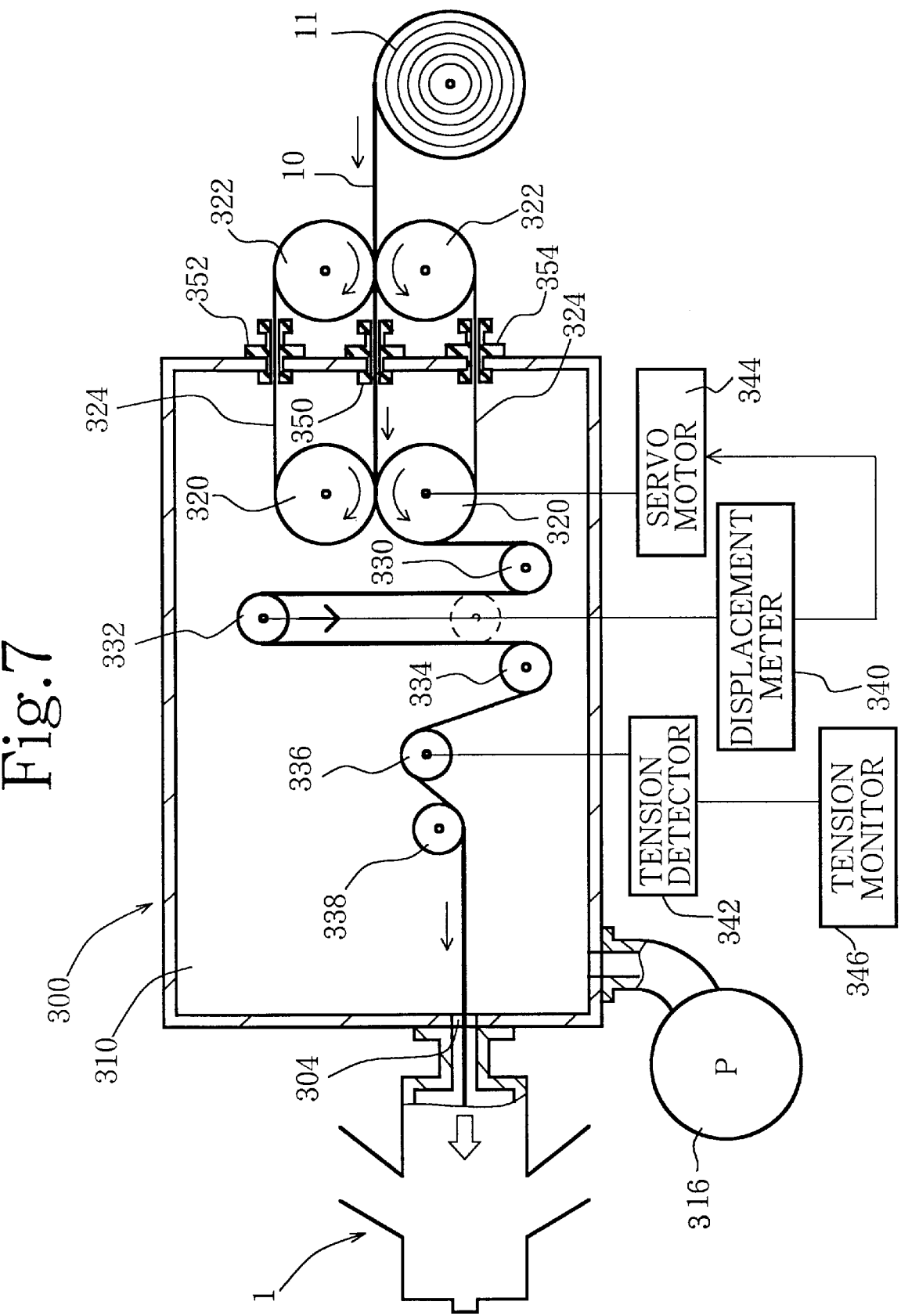
FIG. 7 is a diagram corresponding to FIG. 6 in the form of a forth embodiment.

FIG. 7 is a diagram corresponding to FIG. 6 roughly showing the whole composition. FIG. 8 is a exploded sectional view of the reinforcing cloth inlet portion of a roller type pressure reducing member 300, wherein the roller type pressure reducing member 300 is formed approximately in a box type and a inner space thereof forms a pressure reducing passage 310 from an inlet 302 of the reinforced cloth 10 to an outlet 304 of the head 1, as the same is outlined above, side.

The reinforced cloth 10 is transferred by a sending belt 324, which is made of self-lubricating material such as fluorine resin, wound and hung between an inner roller 320 arranged in a pressure reducing passage 310 and an outer roller 322 are arranged outside of the roller type pressure reducing member 300.

The inner roller 320, the outer roller 322 and the sending belt 324 are arranged as two stages on and under the reinforcing cloth 10 to be a pair, the reinforcing cloth 10 is interposed between the upper and lower sending belts 324 in the compressed state, the upper and the lower rollers 320 and 322 rotate in a reverse direction respectively and a portion compressed on the reinforcing cloth 10 between each of the upper and lower sending belt 324 is moved in the same direction.

The reinforcing cloth 10 is, after transferred by upper and lower sending belt 324, passed through the first to fifth idle roller 330, 332, 334, 336 and 338 arranged in the pressure reducing passage 310 and sent off to the head 1 side. Where, the vacuum pump 316 is joined in the vicinity of the outlet 304.

The second idle roller 332 located between the first and third idle roller can move freely according to a tension applied to the reinforced cloth 10 and the moving amount is detected with a displacement meter 340.

And hence, a tension detector 342 is arranged to the fourth idle roller 336 for detecting a tension applied to the reinforcing cloth 10 and can be watched with a tension monitor 346.

Tension control of the reinforcing cloth 10 is achieved by arranging a servo motor 344 on the lower side roller between the upper and lower main driving rollers, for example, the inner roller 320 for controlling the rotating speed according to the tension and changing the sending belt speed of the upper and lower sending belt 324.

At the time, it is possible to control the servo motor 344 by either a displacement control or tension detection control based on a detected value of the displacement meter 340 or the tension detector 342 of by joint use of both controls.

Figure 8:
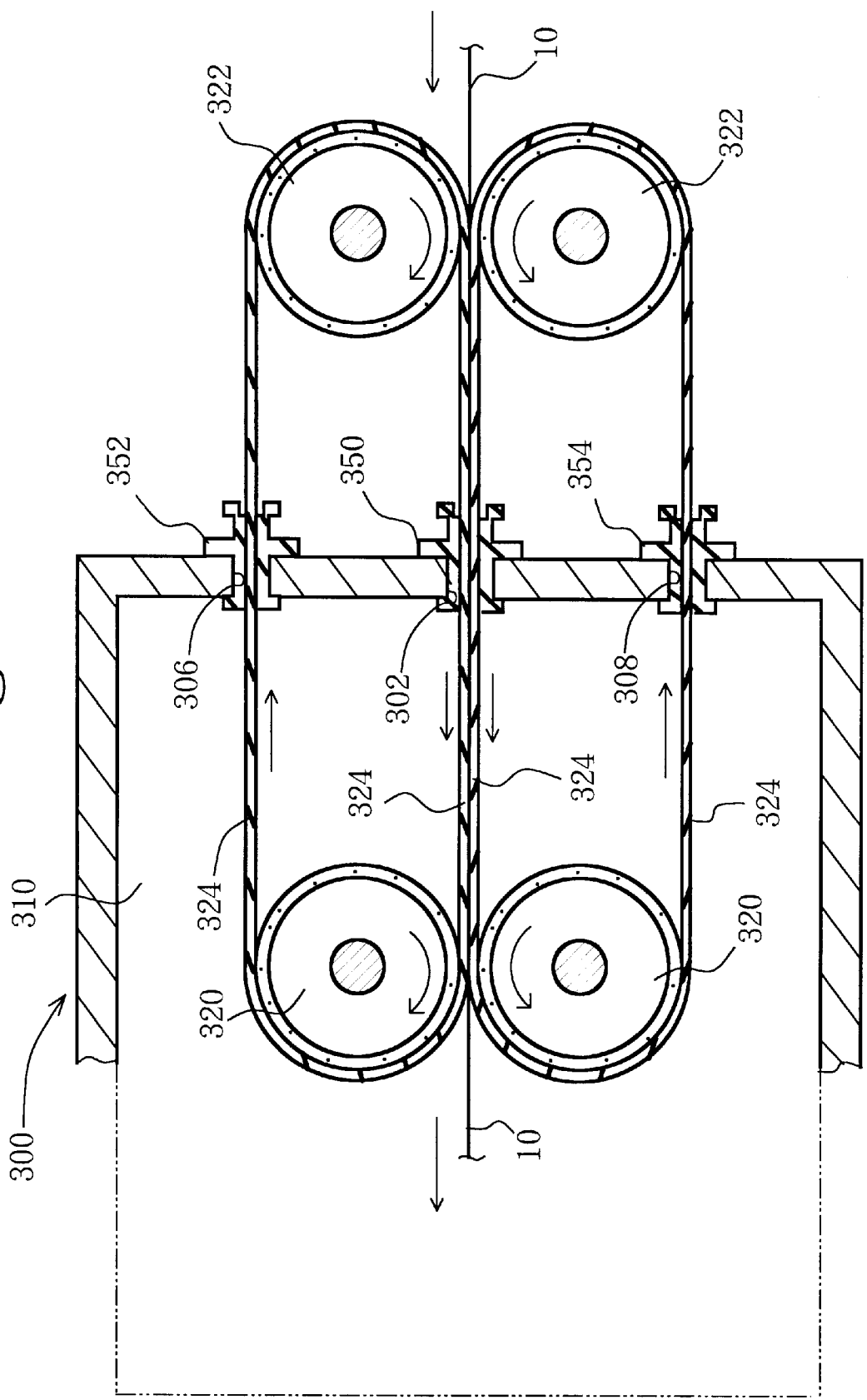
FIG. 8 is an enlarged view sectional of the reinforcing cloth inlet portion of the pressure reducing member.

Besides, as is apparent from FIG. 8, the lower side of the upper stage sending belt 324 and the upper side of the lower stage sending belt 324 enter into the roller type pressure reducing member 300 from the common inlet 302 together with the reinforcing cloth 10 and the upper side of the upper stage sending belt 324 and the lower side of the lower stage sending belt 324 enter into the roller type pressure reducing member 300 from a single inlet 306 and 308 respectively.

Seal packages 350, 352 and 354 made of a material provided with self-lubrication and elasticity, for example, fluorine resin, are fixed on the inlets 302, 306 and 308, to almost tightly close the openings while permitting the sending belt 324 to slide freely.

Thereby, since it is possible to seal the inlet 302, 306 and 308 which communicate with the pressure reducing passage 310 and the atmosphere with the seal packing 350, 352 and 354, even with the atmosphere open type, a sufficient pressure reducing level, for example below 600 mmHg, can be maintained in the pressure reducing passage. Also, as these seal packings have elasticity, the seal ability is improved.

Besides, since the sending belt 324, the seal packing 350, 352 and 354 are composed of the self-lubricating material such as fluorine, a resistance on transferring of the reinforcing cloth 10 can be lessened and since it is not required to have large and excessive tension the tension applied to the reinforced cloth 10 for cutting or transferring of the reinforcing cloth 10 can be prevented and the transferring devices such as the motor can be made compact.

Further, it is possible that the control of the tension applied to the reinforcing cloth 10 is done be either the displacement control or the tension detecting control based on the displacement meter 340 or the tension detector 342 or both of them, control can be achieved easily using many control methods.

Still more, the present invention will not be limited to the form of these embodiments but can be changed into various forms, for example, it is possible to use a resin sheet made of suitable synthetic resin film and the like, substituting the reinforcing cloth. In this case, water or gas is likely to remain essentially on the surface of the resin sheet, but a good adhesion is obtained as mentioned above.

EXAMPLE

The following sample is prepared by the method and device based on the form of the first embodiment, and a comparative sample is prepared in almost the same manner.

Sample:

A knit is used as the reinforcing cloth, EPDM is used as the rubber for the plastic materials of the inside and outside, and a 300 mm long hose of 30.5 mm inside diameter and 39.5 mm diameter is prepared as the sample by the method and device of the above.

Comparative sample:

For each of seven samples and comparative samples of the above, incompressible fluid of 95C flowed into the inside thereof, the incompressible fluid is repeatedly pressurized by impulse at the rate of 40 cycles/min. between 0 to 4 kg/cm$^2$, the number of pressurization until breakdown is measured, and the result is used as the number of limit durability.

The following is the result of measurement.

Test result: (Number of limit durability)

| No. | Comparative Sample | Sample |
| --- | --- | --- |
| 1 | 13,375 | 356,812 |
| 2 | 19,935 | 253,157 |
| 3 | 9,826 | 219,354 |
| 4 | 11,396 | 584,231 |
| 5 | 4,521 | 412,687 |
| 6 | 2,205 | 254,935 |
| 7 | 43,567 | 613,549 |
| Log Average | 9,520 | 357,562 |

As is apparent from the test result, the average number of limit durability of the sample is remarkably improved approximately 36 times that of the comparative sample, and a performance has been obtained that can be sufficiently used as the fluid pressurizing hose for automobile in a hostile application.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing device for a reinforced hose comprising:

a core for forming an inner side of the hose, said core located on an extruding axis line of the hose, coincident to a center of the hose, said core having a generally conical shaped portion with a first sloped surface;

a die located circumferentially of said core for forming an outer side of the hose, an annular slit being formed between said core and said die, said first sloped surface of said generally conical shaped portion of said core being inclined toward the annular slit, said die having a second sloped surface facing said first sloped surface and inclined toward the annular slit, said first and second sloped surfaces forming a space therebetween, the space gradually narrowing toward the annular slit; and a cylindrical shaped guide member for supplying a reinforcing material between the inner and outer sides of the hose, an end portion of said guide member being located within the gradually narrowing space, said guide member including:

a cylindrical shaped inner guide portion;

a cylindrical shaped outer guide portion;

a first supply passage formed between an inner sloped surface of said inner guide portion and said first sloped surface, said first supply passage for supplying a plastic material for forming an inside layer of the hose, said first supply passage gradually narrowing toward the annular slit;

a second supply passage formed between an outer sloped surface of said outer guide portion and said second sloped surface, said second supply passage for supplying a plastic material for forming an outside layer of the hose, said second supply passage gradually narrowing toward the annular slit;

a third supply passage formed between an outer surface of said inner guide portion and an inner surface of said outer guide portion for supplying a reinforcing material, said third supply passage being wider than a thickness of the reinforcing material, a center of an outlet of said third supply passage being coaxial with a center of the annular slit;

an output end portion of the first, second and third supply passages being joined at a common point adjacent to the annular slit;

said third supply passage for supplying reinforcing material being connected to a vacuum pump for reducing pressure therein, the reinforcing material being supplied to the third supply passage under reduced pressure, the inside layer of material supplied from the first supply passage and the outside layer of material supplied from the second supply passage being joined to the reinforcing material at said common point; and said inside layer, said reinforcing material and said outside layer being simultaneously adhered together in the annular slit.

2. The manufacturing device for a reinforced hose according to claim 1, and further including a pressure reducing passage being a vacuum tank connected between said third supply passage and said vacuum pump, and a roll of said reinforcing material is contained within said vacuum tank.

3. The manufacturing device for a reinforced hose according to claim 2, wherein said pressure reducing passage is an open type passage with one end thereof being connected to said reinforcing material supply passage and the other end thereof being opened to the atmosphere and the atmosphere opening portion is an inlet of the reinforcing material to the pressure reducing passage.

4. The manufacturing device for a reinforced hose according to claim 3, wherein said pressure reducing passage is formed by folding it in a plurality of stages.

5. The manufacturing device for a reinforced hose according to claim 4, wherein said pressure reducing passage is formed at the joined portion of a block overlapped in a plurality of stages.

6. The manufacturing device for a reinforced hose according to claim 3, wherein a portion of a roller for supplying said reinforcing material is provided to project out into said pressure reducing passage.

7. The manufacturing device for a reinforced hose according to claim 3, wherein said reinforcing member is sent by a sending belt which is wound and hung between a pair of roller providing inside and outside of said pressure reducing passage, and a seal member is provided in a inlet of said sending belt and said reinforcing fiber member to said pressure reducing passage.

8. The manufacturing device for a reinforced hose according to claim 7, wherein said sending belt and said seal member are composed of self-lubricating material respectively.

\* \* \* \* \*